(12) United States Patent
Seo et al.

(10) Patent No.: US 9,588,912 B2
(45) Date of Patent: Mar. 7, 2017

(54) METHOD AND APPARATUS FOR CONTROLLING MEMORY IN ELECTRONIC DEVICE

(71) Applicants: Samsung Electronics Co., Ltd., Gyeonggi-do (KR); Sungkyunkwan University Research & Business Foundation, Gyeonggi-do (KR)

(72) Inventors: Sunae Seo, Gyeonggi-do (KR); Sanghoon Kim, Gyeonggi-do (KR); Jinsoo Kim, Seoul (KR); Dongjun Shin, Gyeonggi-do (KR)

(73) Assignees: Samsung Electronics Co., Ltd (KR); Sungkyunkwan University Research & Business Foundation (KR)

( * ) Notice: Subject to any disclaimer, the term of this patent is extended or adjusted under 35 U.S.C. 154(b) by 31 days.

(21) Appl. No.: 14/660,392

(22) Filed: Mar. 17, 2015

(65) Prior Publication Data
US 2015/0261547 A1 Sep. 17, 2015

(30) Foreign Application Priority Data
Mar. 17, 2014 (KR) ........................ 10-2014-0031242

(51) Int. Cl.
| G06F 9/24 | (2006.01) |
| G06F 15/177 | (2006.01) |
| G06F 13/16 | (2006.01) |
| H04L 29/08 | (2006.01) |
| G06F 9/445 | (2006.01) |
| G06F 11/07 | (2006.01) |
| G06F 21/52 | (2013.01) |

(52) U.S. Cl.
CPC ...... *G06F 13/1668* (2013.01); *G06F 9/44594* (2013.01); *G06F 8/67* (2013.01); *G06F 11/073* (2013.01); *G06F 11/0793* (2013.01); *G06F 21/52* (2013.01); *H04L 67/06* (2013.01); *H04L 67/32* (2013.01)

(58) Field of Classification Search
CPC .... G06F 21/52; G06F 11/0793; G06F 11/073; G06F 8/67; H04L 67/06; H04L 67/32
USPC ................................................. 713/1, 2, 100
See application file for complete search history.

(56) References Cited

U.S. PATENT DOCUMENTS

| 7,503,044 B2 | 3/2009 | Chew |
| 8,510,743 B2 | 8/2013 | Hackborn et al. |
| 8,887,091 B2 * | 11/2014 | Yamaji ................ G06F 11/0715 713/1 |

* cited by examiner

*Primary Examiner* — Michael J Brown
(74) *Attorney, Agent, or Firm* — The Farrell Law Firm, P.C.

(57) ABSTRACT

A method and an apparatus are provided for controlling a memory in an electronic device. A kernel of a control unit in the electronic device receives importance information, based on program information, and memory usage, from an Operating System (OS) framework of the control unit. It is determined whether a memory request signal is received at the kernel from the OS framework. The kernel terminates at least one program based on the memory request signal and the importance information, when the memory request signal is received.

14 Claims, 7 Drawing Sheets

METHOD AND APPARATUS FOR CONTROLLING MEMORY IN ELECTRONIC DEVICE

PRIORITY

This application claims priority under 35 U.S.C. §119(a) to Korean Patent Application No. 10-2014-0031242, filed on Mar. 17, 2014, which is incorporated herein by reference.

BACKGROUND OF THE INVENTION

1. Field of the Invention

The present invention relates generally to a memory of electronic device, and more particularly, to a method and an apparatus for controlling the memory through an Operating System (OS) framework and a kernel.

2. Description of the Prior Art

Electronic devices are capable of performing various functions such as, for example, a capturing a static image or a moving picture, playing a multimedia file such as a music file or a video file, playing a game, receiving and transmitting a broadcast, and executing a road guide service. Furthermore, electronic devices are also able to support a function that simultaneously executes various functions.

A memory of an electronic device is managed on an OS level. For example, the electronic device may manage a background process based on a recent execution sequence on the OS level. The electronic device may manage a memory by terminating a previously executed program except for the last executed program, based on the recent execution sequence.

SUMMARY OF THE INVENTION

When a memory is deficient, an electronic device may terminate a program that uses most of the memory or may terminate the most recently executed program, among programs having the least importance. However, terminating the program in such a manner causes inefficiency since it does not consider a user's experience. For example, when a program having a long booting time is terminated, an electronic device has to wait a long time in order to restart the program.

The present invention has been made to address at least the above problems and/or disadvantages and to provide at least the advantages described below. Accordingly, an aspect of the present invention provides a method and an apparatus for controlling a memory by terminating a program according to an importance based on user experience when a background program is terminated to secure a necessary memory.

According to an aspect of the present invention, a method is provided for controlling a memory in an electronic device. A kernel of a control unit in the electronic device receives importance information, based on program information, and memory usage, from an Operating System (OS) framework of the control unit. It is determined whether a memory request signal is received at the kernel from the OS framework. The kernel terminates at least one program based on the memory request signal and the importance information, when the memory request signal is received.

According to another aspect of the present invention, an apparatus is provided for controlling a memory in an electronic device. The apparatus includes an OS framework of a control unit that collects program information, determines importance information according to the program information, transmits, to a kernel of the control unit, the importance information and a memory usage, and transmits a memory request signal when a memory request is detected. The apparatus also includes the kernel that receives the importance information and the memory usage from the OS framework, determines whether the memory request signal is received, selects at least one program to be terminated based on the memory request signal and the importance information when the memory request signal is received, and terminates the at least one program.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
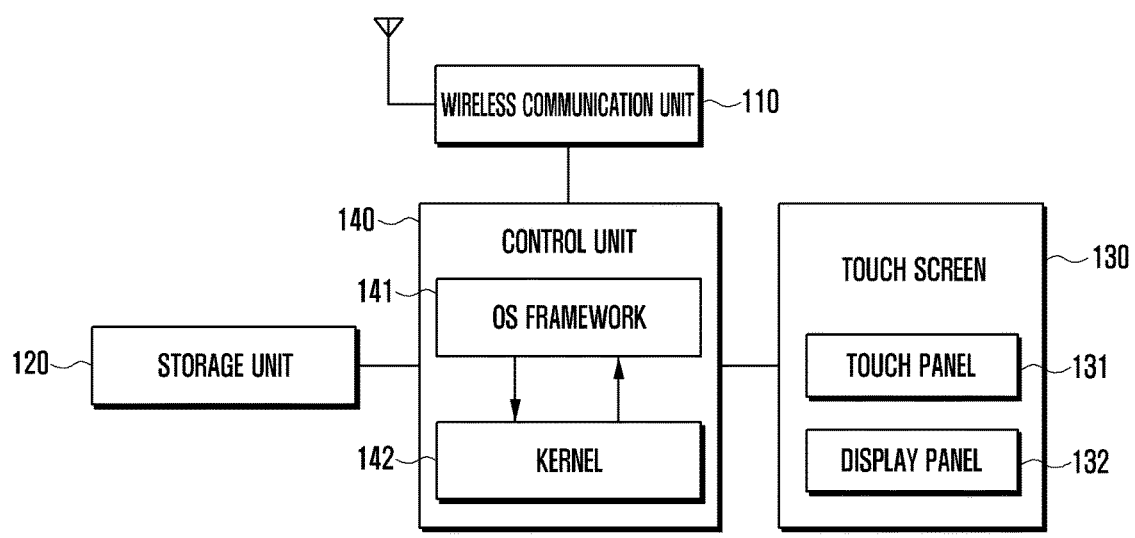
FIG. 1 is a diagram illustrating a construction of an electronic device including an OS framework and a kernel, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The term 'program information', as used herein, refers to information on an application program executed by an electronic device. The program information includes information on a booting time (i.e., a time taken before a program may be used after the program is started) of a corresponding program, a memory capacity, an execution time, a time when an execution of a program is started to a time when the execution of the program is terminated, a network access amount, a program use frequency, and the like.

In an embodiment of the present invention, an OS framework provides a public library and an execution environment to a program, and manages a window, a package and the like. In an embodiment of the present invention, a kernel provides services such as, for example, a management of a memory and a process, a network, and the like, to the OS framework.

FIG. 1 is a diagram illustrating a construction of an electronic device including an OS framework and a kernel, according to an embodiment of the present invention.

Referring to FIG. 1, the electronic device includes a wireless communication unit 110, a storage unit 120, a touch screen 130, and a control unit 140.

The wireless communication unit 110 may include one or more modules, which enable wireless communication between the electronic device and a wireless communication system, or between the electronic device and a network including another electronic device. For example, the wireless communication unit 110 may include a mobile communication module, a Wireless Local Area Network (WLAN) module, a short-range communication module, a location calculating module, a broadcast receiving module, and the like. More specifically, according to an embodiment of the present invention, the wireless communication unit 110 performs wireless communication when the wireless communication unit 110 detects an application execution.

The storage unit 120 may store all programs for the electronic device. More specifically, according to an embodiment of the present invention, the storage unit 120 stores program information.

The touch screen 130 includes a touch panel 131 and a display panel 132. When a user input is generated, the touch panel 131 transfers this input to the control unit 140. The user input may be provided through a touch input tool such as, for example, an electronic pen or a finger. The display panel 132 displays contents transferred from the control unit 140.

The control unit 140 includes an OS framework 141 and a kernel 142, and controls the overall operation of the electronic device. Specially, according to an embodiment of the present invention, the control unit 140 collects the program information by reflecting a user experience and considering system efficiency. The collected program information may be information on a booting time of a program, a use frequency, an execution time from a time when program execution is started to a time when the program execution is terminated, a recent use frequency, a memory capacity, a network access amount, and the like. In addition, the control unit 140 determines an importance according to the collected program information. The control unit 140 calculates the amount of memory usage. The control unit 140 detects an execution of a program (e.g., an application). The control unit 140 detects a memory request signal according to the execution of the program. The memory request signal may be for allocating a memory required to execute the program. The control unit 140 terminates execution of a program of a low importance in order to secure a necessary memory according to a generation of the memory request signal. In addition, when the control unit 140 determines a deficiency of the memory, in order to secure the necessary memory, the control unit 140 terminates (or kills) the execution of the program of low importance. Detailed operations performed by the control unit 140 are described in detail below with reference to operations performed by the OS framework 141 and the kernel 142 with reference to FIGS. 2A, 2B, 2C, 3, 4, and 5.

Figure 2A:
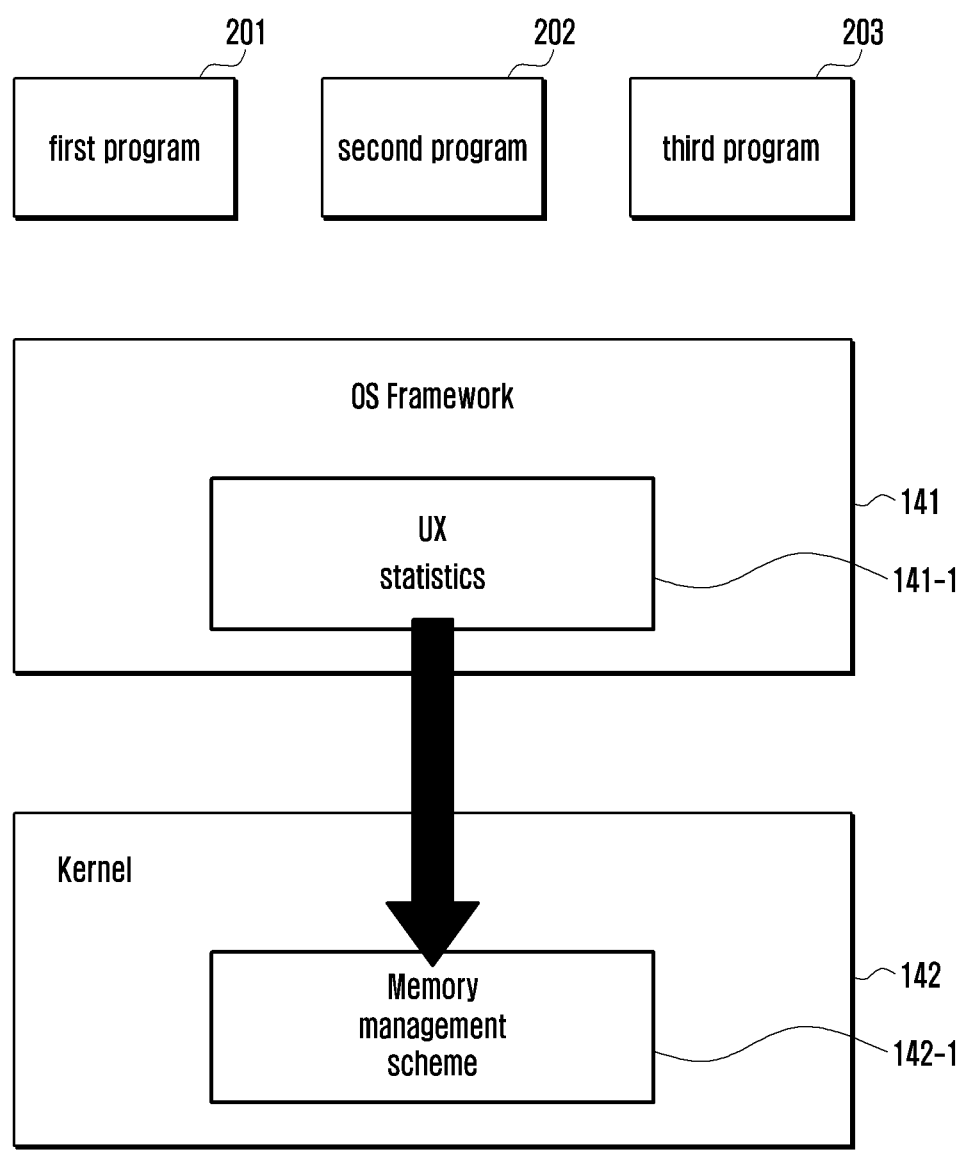
FIGS. 2A to 2C are diagrams illustrating operation processes of the OS framework and the kernel, according to an embodiment of the present invention.
Figure 2B:
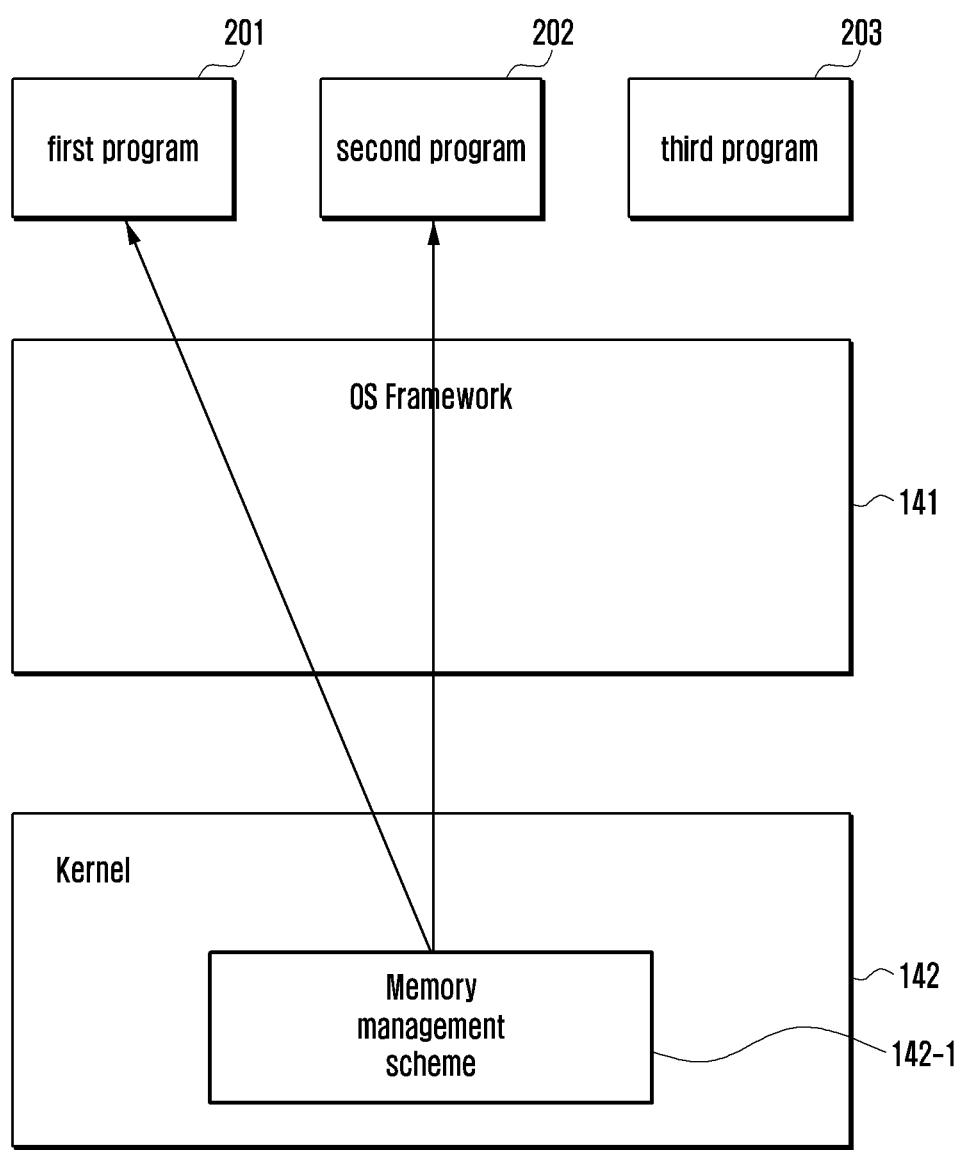
Figure 2C:
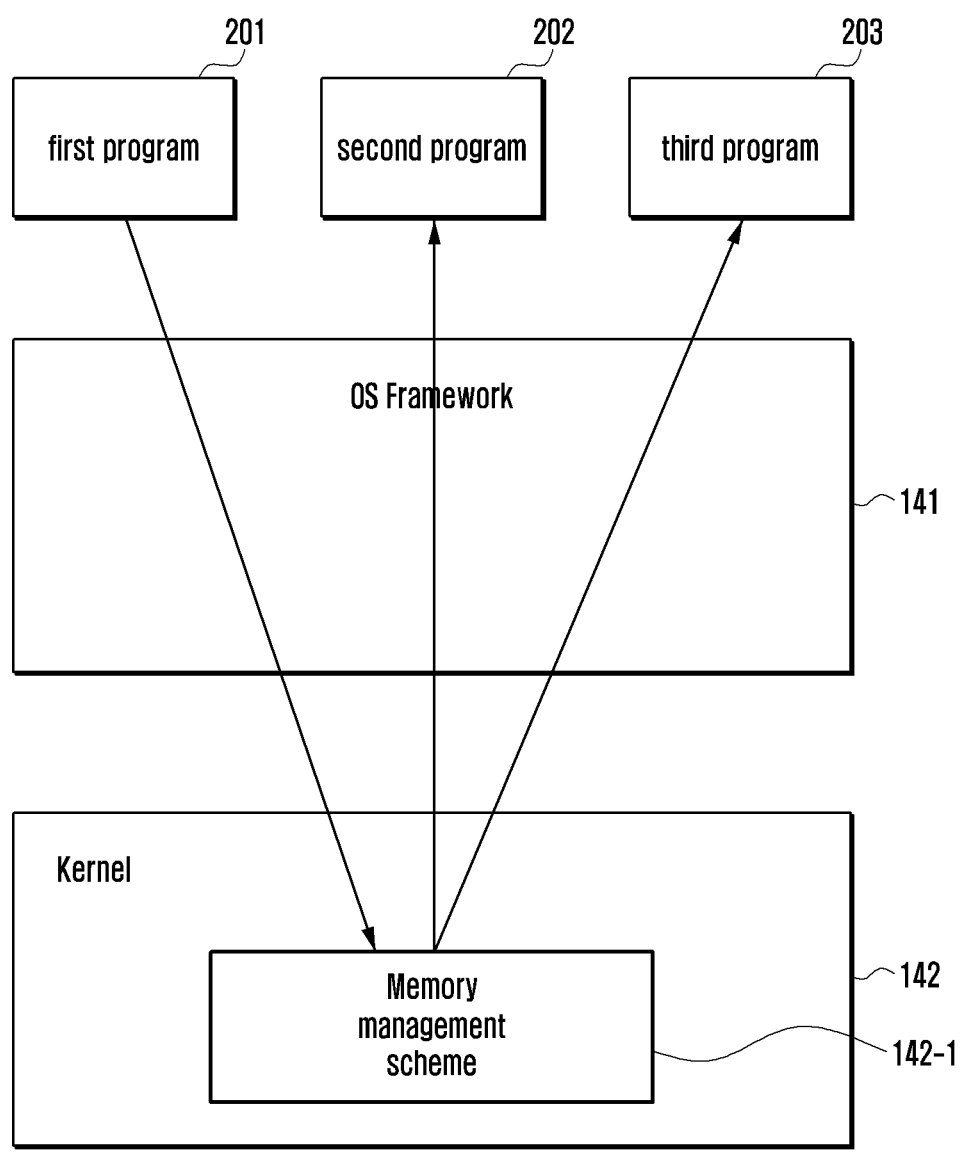
Figure 3:
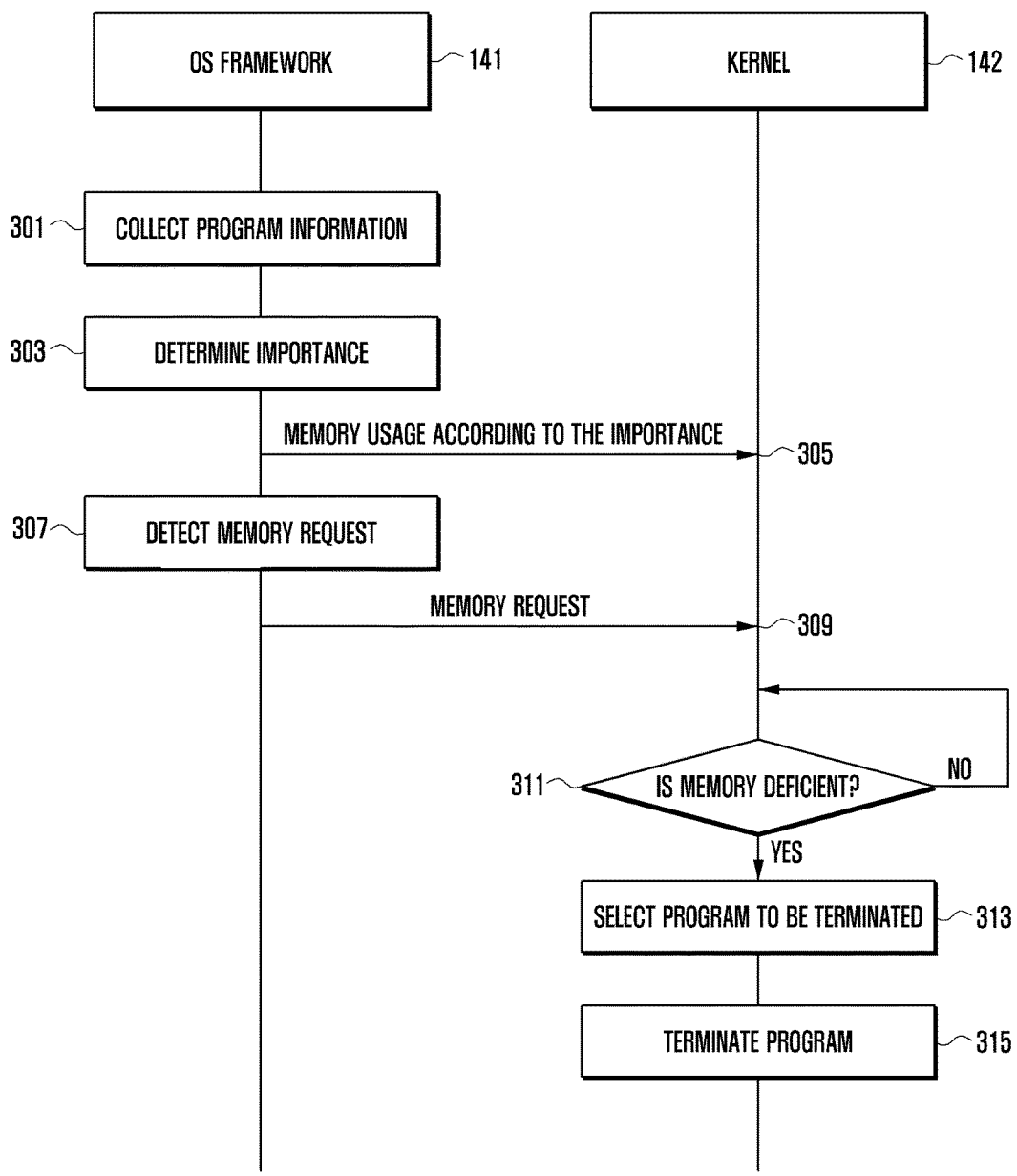
FIG. 3 is a flowchart illustrating the operation processes of the OS framework and the kernel, according to an embodiment of the present invention.

FIGS. 2A to 2C are diagrams illustrating operation processes of the OS framework and the kernel, according to an embodiment of the present invention. FIG. 3 is a flowchart illustrating the operation processes of the OS framework and the kernel, according to an embodiment of the present invention.

FIG. 2A is a diagram illustrating an operation process of the OS framework. Referring to FIG. 2A, the OS framework 141 collects the program information stored in the electronic device. The program information may be information on a booting time of a program, a memory capacity, an execution time, a time from starting program execution to a time terminating program execution, a network access amount, a use frequency of the program, and the like. In addition, the OS framework 141 determines an importance corresponding to the collected program information 141-1, and transmits the importance to the kernel 142. The kernel 142 receives a memory usage amount according to the importance from the OS framework 141 and the execution of the program. The kernel 142 manages a memory management scheme 142-1, and manages the received memory usage amount as the memory management scheme 142-1.

FIG. 2B is a diagram illustrating an operation process of the kernel. Referring to FIG. 2A, the kernel 142 receives the memory usage amount from the OS framework 141 while maintaining the standby state. In addition, when the kernel 142 determines a memory deficiency according to the execution of the program, the kernel 142 selects a program to be terminated according to the importance of the program, and terminates the selected program (e.g., a first program 201 and a second program 202). The importance of the program is an importance determined by the collected program information. Therefore, the kernel 142 simultaneously terminates at least one program of a low importance according to the memory management scheme 142-1.

FIG. 2C is a diagram illustrating an process of the OS framework. Referring to FIG. 2C, the OS framework 141 maintains the standby state. In the standby state, the OS framework 141 collects the program information, determines the importance according to the collected program information, and transmits the importance to the kernel 142. When the OS framework 141 detects, for example, the first program, in the standby state, the OS framework 141 calculates a memory necessary to execute the first program and transmits a memory request signal to the kernel 142. When the kernel 142 receives the memory request signal, the kernel 142 determines a necessary memory according to the memory request signal. The kernel 142 selects a program to be terminated to secure a memory required by the OS framework 141. In selecting the program to be terminated, the kernel 142 selects a program of low importance, and the program selected by the kernel 142 is proper to the necessary memory. When the kernel 142 selects the program to be terminated, the kernel 142 terminates at least one program (e.g., the first program 201, the second program 202, and the third program 203) according to the memory management scheme 142-1.

FIG. 3 is a flowchart illustrating the operation processes of the OS framework and the kernel, according to an embodiment of the present invention.

Referring to FIG. 3, in step 301, the OS framework 141 collects the program information in consideration of a user's experience and efficiency. The program information may be information on a booting time of a program, a memory capacity, an execution time, a time from starting program execution until terminating program execution, a network access amount, a use frequency of the program, and the like. In step 303, the OS framework 141 determines the importance of the program that is being executed, based on the collected program information. For example, a high value of importance may be given to a program that is frequently used, and a low value of importance may be given to a program that is used less frequently. In step 305, the OS framework 141 transmits the memory usage amount according to the determined importance of the program and the execution of the program to the kernel 142. The memory usage amount is an amount of the memory, which is used according to the execution of the program from the total available amount of memory. Thus, the control unit 140 determines the available amount of the memory. In step 307, the OS framework 141 detects a memory request signal. In step 309, the OS framework 141 transmits the memory request signal to the kernel 142. The memory request signal may request an amount of memory necessary to execute the program. For example, when the OS framework 141 detects a camera execution request, the OS framework 141 transmits a memory request signal, which requests a memory (e.g., 400 MB) necessary to execute a camera, to the kernel 142. When the kernel 142 receives the memory request signal from the OS framework 141, the kernel 142 determines whether the memory is deficient or not, in step 311. When the kernel 142 determines that the memory is deficient, the kernel 142 selects at least one program to terminate. The selected at least one program is an optimum program combination determined by the importance information. The optimum program combination is a combination searched for satisfying the necessary memory according to the collected program information. Thus, one or more programs may be selected, according to the necessary memory. In addition, the optimum program combination may be one or more programs satisfying a given limit condition (e.g., a user experience for increasing an efficiency, and a booting time), and may be a combination of the programs having the least importance as well as the satisfaction of the above-mentioned limit condition. In step 315, the kernel 142 simultaneously terminates the selected one or more programs.

Figure 4:
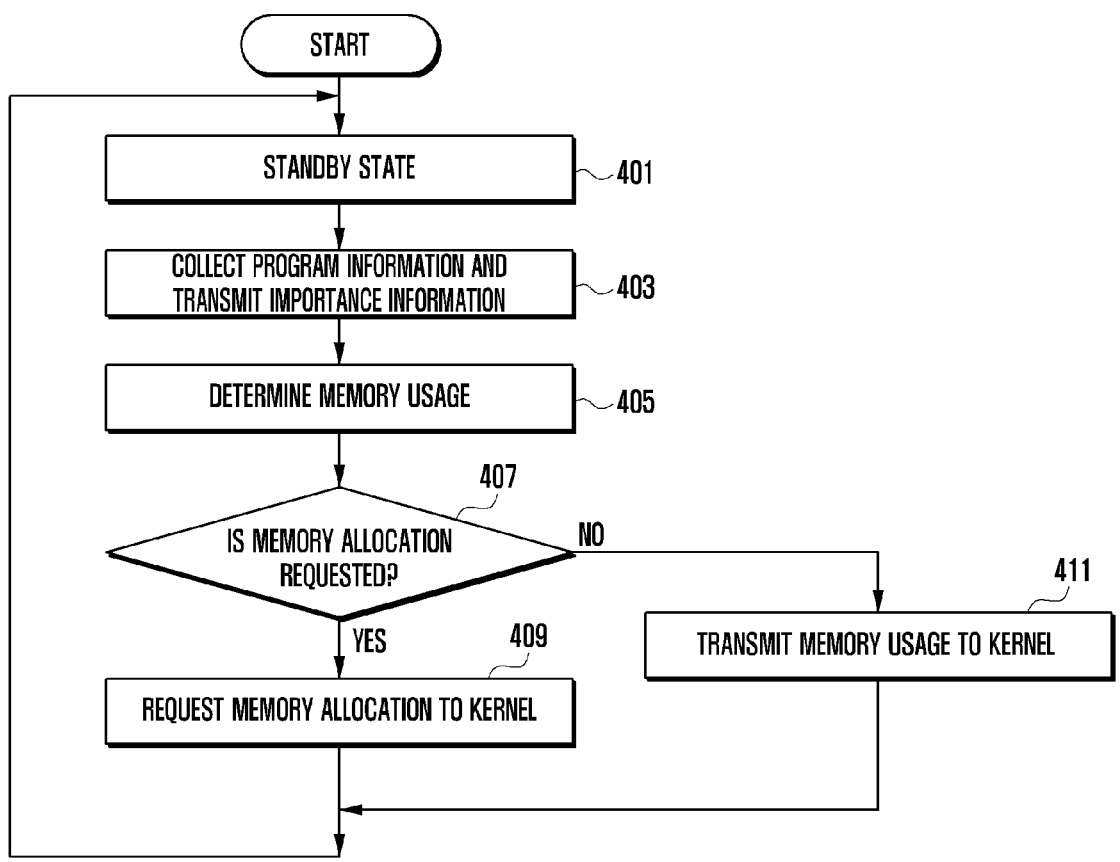
FIG. 4 is a flowchart illustrating an operation process of the OS framework, according to an embodiment of the present invention.

FIG. 4 is a flowchart illustrating an operation process of the OS framework, according to an embodiment of the present invention.

Referring to FIG. 4, in step 401, the OS framework 141 maintains a standby state. The standby state is a state in which power is supplied, and in which the OS framework 141 can receive a control instruction, specific information, and the like, from an external electronic device or a base station. In step 403, the OS framework 141 maintaining the standby state collects the program information. The OS framework 141 may determine the importance of the program based on the collected program information. For example, the longer an execution time for a program, the higher the importance of the program, and the shorter the execution time of the program, the lower the importance of the program. The OS framework 141 determines the importance information and transmits the importance information to the kernel 142. The program information is the information on the application program executed by the electronic device. The program information includes the information on a booting time of a corresponding program, a memory capacity, an execution time (i.e., a time from starting program execution until terminating program execution) of the program, a network access amount, a usage frequency of the program, and the like. In step 405, memory usage is determined. In step 407, it is determined whether the OS framework 141 detects a memory request signal for a memory allocation request according to the execution of the program (e.g., when the OS framework 141 detects a program execution request). When the OS framework 141 detects the memory request signal, the OS framework 141 transmits the memory request signal to the kernel 142, in step 409. An amount of the memory according to the memory request signal is a memory amount required in a program of which an execution is detected. When the OS framework 141 does not detect the memory request signal, the OS framework 141 transmits the memory use amount of the program that is currently being executed to the kernel 142 and maintains the standby state, in step 411. The OS framework 141 may transmit the memory use amount to the kernel 142 through a kernel interface or an internal system call.

As described above, the OS framework 141 collects the program information by reflecting the user experience and considering the system efficiency. The information on the system efficiency includes a booting time, an execution time, a network access amount, a use frequency of the program, and the like. In addition, the OS framework 141 evaluates the importance of the program based on the collected program information, and transmits an evaluation result and program execution information to the kernel 142.

Figure 5:
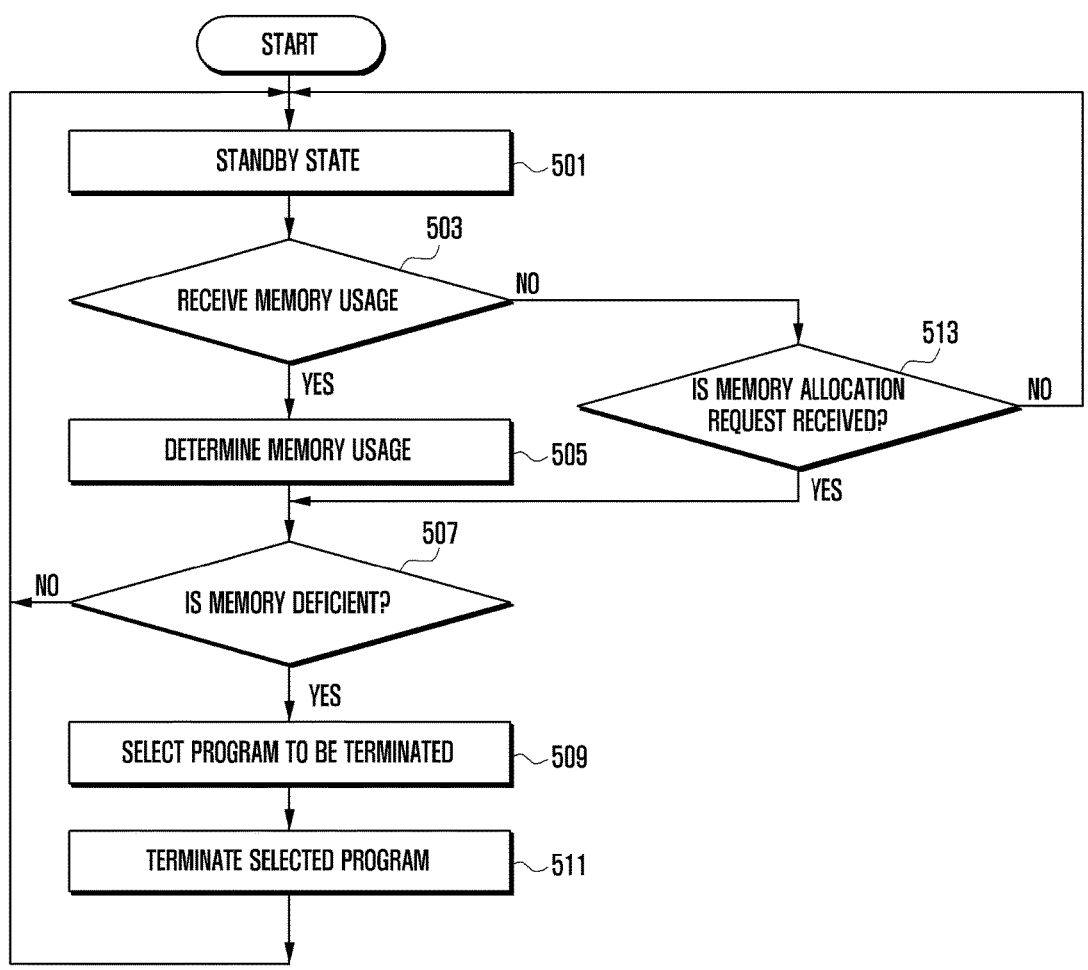
FIG. 5 is a flowchart illustrating an operation process of the kernel, according to an embodiment of the present invention.

FIG. 5 is a flowchart illustrating an operation process of the kernel, according to an embodiment of the present invention. Referring to FIG. 5, in step 501, the kernel 142 maintains the standby state. The standby state refers to a state in which power is supplied to the kernel 142, and in which the kernel 142 receives the importance information of the program determined according to the collected program information and the memory use amount according to the program execution, from the OS framework 141. In step 503, the kernel 142 determines whether the memory use amount is received from the OS framework 141. When the kernel 142 receives the memory use amount from the OS framework 141, the kernel 142 determines a memory use amount according to the currently executed program, in step 505, and continues to step 507.

When the kernel 142 does not receive the memory use amount from the OS framework 141, the kernel 142 determines whether the memory request signal requesting the memory allocation is received from the OS framework 141, in step 513. When the kernel 142 receives the memory request signal, the kernel 142 may receive the memory use amount and the memory request signal through a kernel interface or an internal system call, and proceeds to step 507. When the kernel 142 does not receive the memory request signal, the kernel 142 returns to step 501, and maintains the standby state.

In step 507, the kernel 142 determines whether the memory is deficient. When the memory is not deficient, the kernel 142 returns to step 501 and maintains the standby state. When the memory is deficient, the kernel 142 selects a program, and terminates execution of the selected program, in step 511. The kernel 142 selects the optimum program combination based on the importance information determined according to the program information. The optimum program combination is a combination found to terminate one or more programs in correspondence to a necessary memory amount based on the collected program information. When the kernel 142 terminates (or kills) one or more selected programs, the kernel returns to step 501, and maintains the standby state.

As described above, the kernel 142 receives the memory use amount or the memory request signal according to the program information from the OS framework 141. The kernel 142 calculates the memory use amount. When the kernel 142 determines a memory deficiency, the kernel 142 selects a program and terminates execution of the selected program. The kernel 142 selects the program according to the importance information determined based on the program information received from the OS framework 141. That is, when the kernel 142 selects the program, the kernel 142 refers to the user experience, and selects a program that has the least amount of influence on the system efficiency. In addition, when the kernel 142 selects the program, the kernel 142 simultaneously stops one or more programs based on the necessary amount of memory. The necessary amount of memory is received from the OS framework 141.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of controlling a memory in an electronic device, the method comprising the steps of:
   receiving, by a kernel of a control unit in the electronic device, importance information, based on program information, and memory usage, from an Operating System (OS) framework of the control unit;
   determining whether a memory request signal is received at the kernel from the OS framework;
   identifying, by the kernel, an amount of necessary memory corresponding to the memory request signal, when the memory request signal is received; and
   terminating, by the kernel, at least one program corresponding to the amount of the memory based on the importance information, to secure the amount of the necessary memory.

2. The method of claim 1, wherein the program information is collected by the OS framework.

3. The method of claim 1, wherein the memory usage is based on program execution.

4. The method of claim 1, further comprising:
   determining, by the kernel, whether a memory is deficient based on the memory usage; and
   terminating the at least one program according to the importance information, when the memory is deficient.

5. The method of claim 1, wherein the memory request signal requests an amount of memory necessary to execute a program.

6. The method of claim 1, wherein terminating the at least one program comprises:
   determining, by the kernel, whether a memory is deficient based on the memory usage and the memory request signal; and
   terminating the at least one program based on the importance information, when the memory is deficient.

7. The method of claim 1, wherein the program information comprises at least one of a program booting time, an execution frequency, a memory usage, an execution time, and a network and storage device access amount.

8. An apparatus for controlling a memory in an electronic device, the apparatus comprising:
   an Operating System (OS) framework of a control unit that collects program information, determines importance information according to the program information, transmits, to a kernel of the control unit, the importance information and a memory usage, and transmits a memory request signal when a memory request is detected; and
   the kernel that receives the importance information and the memory usage from the OS framework, determines whether the memory request signal is received, identifies an amount of necessary memory corresponding to the memory request signal when the memory request signal is received, and terminates at least one program corresponding to the amount of the memory based on the importance information, to secure the amount of the necessary memory.

9. The apparatus of claim 8, wherein the OS framework transmits the memory usage according to a program execution.

10. The apparatus of claim 8, wherein the OS framework transmits the memory request signal to the kernel according to a program execution.

11. The apparatus of claim 8, wherein the kernel terminates the at least one program according to the importance information, when the kernel determines that a memory is deficient after receiving the memory usage from the OS framework.

12. The apparatus of claim 8, wherein the memory request signal requests an amount of memory necessary to execute a program.

13. The apparatus of claim 8, wherein the kernel determines whether a memory is deficient based on the memory usage and the memory request signal, and terminates the at least one program according to the importance information, when the kernel determines that a memory is deficient after receiving the memory request signal.

14. The apparatus of claim 8, wherein the program information comprises at least one of a program booting time, an execution frequency, the memory usage, an execution time, and a network access amount.

* * * * *